US009128956B2

(12) United States Patent  (10) Patent No.: US 9,128,956 B2
Salmre et al.  (45) Date of Patent: Sep. 8, 2015

(54) LOCATION AWARE MOBILE-DEVICE SOFTWARE DEVELOPMENT

(75) Inventors: Ivo W. Salmre, Aechen (DE); Frank Mantek, Wermelskirchen (DE); Gotz-Philip Brasche, North-Rhine-Westphalia (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 103 days.

(21) Appl. No.: 12/581,580

(22) Filed: Oct. 19, 2009

(65) Prior Publication Data

US 2010/0042320 A1  Feb. 18, 2010

Related U.S. Application Data

(62) Division of application No. 10/998,081, filed on Nov. 26, 2004, now Pat. No. 7,627,425.

(51) Int. Cl.
  *G06F 17/30*  (2006.01)
(52) U.S. Cl.
  CPC ................................ *G06F 17/30241* (2013.01)
(58) Field of Classification Search
  None
  See application file for complete search history.

(56) References Cited

U.S. PATENT DOCUMENTS

| | | | | |
|---|---|---|---|---|
| 5,848,373 | A * | 12/1998 | DeLorme et al. | 701/455 |
| 6,252,544 | B1 * | 6/2001 | Hoffberg | 342/357.31 |
| 6,266,595 | B1 * | 7/2001 | Greatline et al. | 701/50 |
| 6,266,614 | B1 * | 7/2001 | Alumbaugh | 701/468 |
| 6,639,522 | B2 * | 10/2003 | Derderian | 340/945 |
| 6,671,619 | B2 * | 12/2003 | Kusano et al. | 701/428 |
| 6,691,032 | B1 * | 2/2004 | Irish et al. | 701/487 |
| 6,697,734 | B1 * | 2/2004 | Suomela | 701/455 |
| 6,868,335 | B2 * | 3/2005 | Obradovich et al. | 701/451 |
| 6,944,539 | B2 * | 9/2005 | Yamada et al. | 701/428 |
| 6,944,679 | B2 * | 9/2005 | Parupudi et al. | 709/246 |
| 6,978,206 | B1 | 12/2005 | Pu et al. | |
| 7,089,109 | B2 | 8/2006 | Vance et al. | |

(Continued)

FOREIGN PATENT DOCUMENTS

| | | | |
|---|---|---|---|
| CN | 1304849 | 3/2007 | |
| EP | 1 435 600 | 7/2004 | G08G 1/09 |

(Continued)

OTHER PUBLICATIONS

Office Action mailed Oct. 10, 2007, in European Pat. Appl. No. 05109931.5.
Office Action mailed Feb. 2, 2007, in European Pat. Appl. No. 05109931.5.
Office Action mailed Aug. 8, 2008, in Chinese Pat. Appl. No. 200510119201.4, w/Translation.

(Continued)

*Primary Examiner* — Nicholas Kiswanto
(74) *Attorney, Agent, or Firm* — Dan Choi; Judy Yee; Micky Minhas

(57) ABSTRACT

A development environment makes it easier to develop and use location aware software applications. Combining the currently separate and complex tasks of location information gathering, analysis, and display and making them integrated such that non-experts can build location services into their applications increases a developer's capability to write rich location-aware software applications. A higher level programming model allows a programmer to use location information as a logical entity rather than just raw location data, such as latitude and longitude. A location data store and map data store may be accessed by different location aware applications on the device. Instead of each location application relying on its own data store, applications may share their location related information.

20 Claims, 8 Drawing Sheets

(56) References Cited

U.S. PATENT DOCUMENTS

| | | | |
|---|---|---|---|
| 7,133,774 B2* | 11/2006 | Hessing et al. | 701/431 |
| 7,181,227 B2 | 2/2007 | Wilson et al. | |
| 7,343,381 B2* | 3/2008 | Shin | 1/1 |
| 7,383,316 B2 | 6/2008 | Koch et al. | |
| 7,386,318 B2 | 6/2008 | Moon et al. | |
| 7,627,425 B2 | 12/2009 | Salmre et al. | 701/208 |
| 7,880,642 B2* | 2/2011 | Gueziec | 340/905 |
| 7,881,730 B2* | 2/2011 | Sheha et al. | 455/456.1 |
| 2002/0049533 A1 | 4/2002 | Kusano et al. | 701/209 |
| 2002/0116121 A1* | 8/2002 | Ruiz et al. | 701/208 |
| 2002/0118118 A1 | 8/2002 | Myllymaki et al. | 340/686.1 |
| 2002/0120397 A1* | 8/2002 | Kepler | 701/209 |
| 2004/0030493 A1* | 2/2004 | Pechatnikov et al. | 701/208 |
| 2004/0044468 A1* | 3/2004 | Adachi | 701/208 |
| 2004/0073356 A1 | 4/2004 | Craine | 701/117 |
| 2004/0110515 A1* | 6/2004 | Blumberg et al. | 455/456.1 |
| 2004/0215387 A1* | 10/2004 | Adachi et al. | 701/208 |
| 2004/0225433 A1* | 11/2004 | Burt | 701/200 |
| 2005/0122236 A1* | 6/2005 | Brauer et al. | 340/995.24 |
| 2005/0268254 A1* | 12/2005 | Abramson et al. | 715/855 |

FOREIGN PATENT DOCUMENTS

| | | | | |
|---|---|---|---|---|
| JP | 2004-030457 | 1/2004 | | G06F 15/02 |
| JP | 2004-279299 | 10/2004 | | G01C 21/00 |
| JP | 2004-301804 | 10/2004 | | G01C 21/00 |
| JP | 2004-077254 | 11/2004 | | G01C 21/00 |
| JP | 2004-325366 | 11/2004 | | G01C 21/00 |
| JP | 4938284 | 3/2012 | | |
| WO | 2000/49530 | 8/2000 | | G05F 17/30 |

OTHER PUBLICATIONS

Office Action mailed Jul. 10, 2009, in Chinese Pat. Appl. No. 200510119201.4, w/Translation.

Office Action mailed Feb. 4, 2011, in Japanese Pat. Appl. No. 2005-312951, w/Translation.

Office Action mailed Oct. 28, 2011, in Japanese Pat. Appl. No. 2005-312951, w/translation.

Office Action mailed Jul. 22, 2011, in Japanese Pat. Appl. No. 2005-312951, w/Translation.

Office Action mailed Apr. 24, 2012, in Taiwan Pat. Appl. No. 10-2005-0094256, w/Translation.

Office Action mailed Feb. 15, 2012, in European Pat. Appl. No. 05 109 931.5.

Baldzer, et al.; "Location-Aware Mobile Multimedia Applications on the Niccimon Platform"; The 2nd Symposium on Informationssysteme fur Mobile Anwendungen IMA. vol. 4; 2004; 2 pages.

Maass, H.; "Location-aware mobile applications based on directory services"; In Journal of Mobile Networks and Application—Special issue on protocols and software paradigms of mobile networks archive vol. 3 Issue 2; 1998-08; 17 pages.

Virrantaus, et al.; "Developing GIS-supported location-based services"; In Proceedings of the Second International Conference on Web Information Systems Engineering, Dec. 3, 2001; 10 pages.

Chinese Notice on Grant mailed Apr. 27, 2010 in Chinese Pat Appln No. 200510119210.4, (.0309CC01); 3 pages.

JP Notice of Allowance mailed Feb. 17, 2012 in Japanese Pat. Appl. No. 2005-312951, w/Translation (.0309JP01); 6 pages.

India First Office Action Issued in Patent Application No. 2802/DEL/2005A, Mailed Date: Dec. 30, 2014, 2 pages.

* cited by examiner

LOCATION AWARE MOBILE-DEVICE SOFTWARE DEVELOPMENT

RELATED APPLICATIONS

This application is a divisional of and claims priority to application Ser. No. 10/998,081, filed Nov. 26, 2004, entitled LOCATION AWARE MOBILE-DEVICE SOFTWARE DEVELOPMENT.

BACKGROUND OF THE INVENTION

In the past several years more and more applications utilizing location information have been developed. Some of these location applications include map programs, flight-tracker programs, and navigation programs. Many of these applications are being developed for mobile computing devices. For example, in-car navigation systems have been developed to help users navigate through a city. Some cellular phones also include GPS based navigation programs. It is very difficult, however, to develop these applications. Positioning systems typically only provide location data, such as latitude and longitude, and require the application to process and interpret the information.

SUMMARY OF THE INVENTION

Embodiments of the present invention are related to a system and method for making it easier to develop and use location aware software applications. Combining the currently separate and complex tasks of location information gathering, analysis, and display and making them integrated such that non-experts can build location and mapping services into their applications increases a developer's capability to write rich location-aware software applications.

According to one aspect, an application programming interface for building location aware applications is used. This higher level programming model is directed towards allowing a programmer to use location information as a logical entity rather than just raw location data, such as latitude and longitude. The location information is abstracted into areas of interest. The developer also does not need to concern themselves with building their own map rendering software and may use rendering engines developed by third parties.

According to another aspect of the invention, an event driven programming model is used in building the location aware applications. Events may be generated in response to the location of an item relative to an area of interest. For example, a programmer designates one routine to be executed when a device enters a first area of interest, and another routine to be executed when a device leaves a second area of interest.

According to yet another aspect of the invention, a location data store may be accessed by different location aware applications. Instead of each location application relying on its own data store, applications may share their location related information.

According to yet another aspect of the invention, shared maps may be accessed by different location aware applications. Instead of each location application relying on its own map store and map rending technology, applications may work with a shared repository of maps data and map rendering engines.

DETAILED DESCRIPTION OF THE PREFERRED EMBODIMENT

Figure 3:
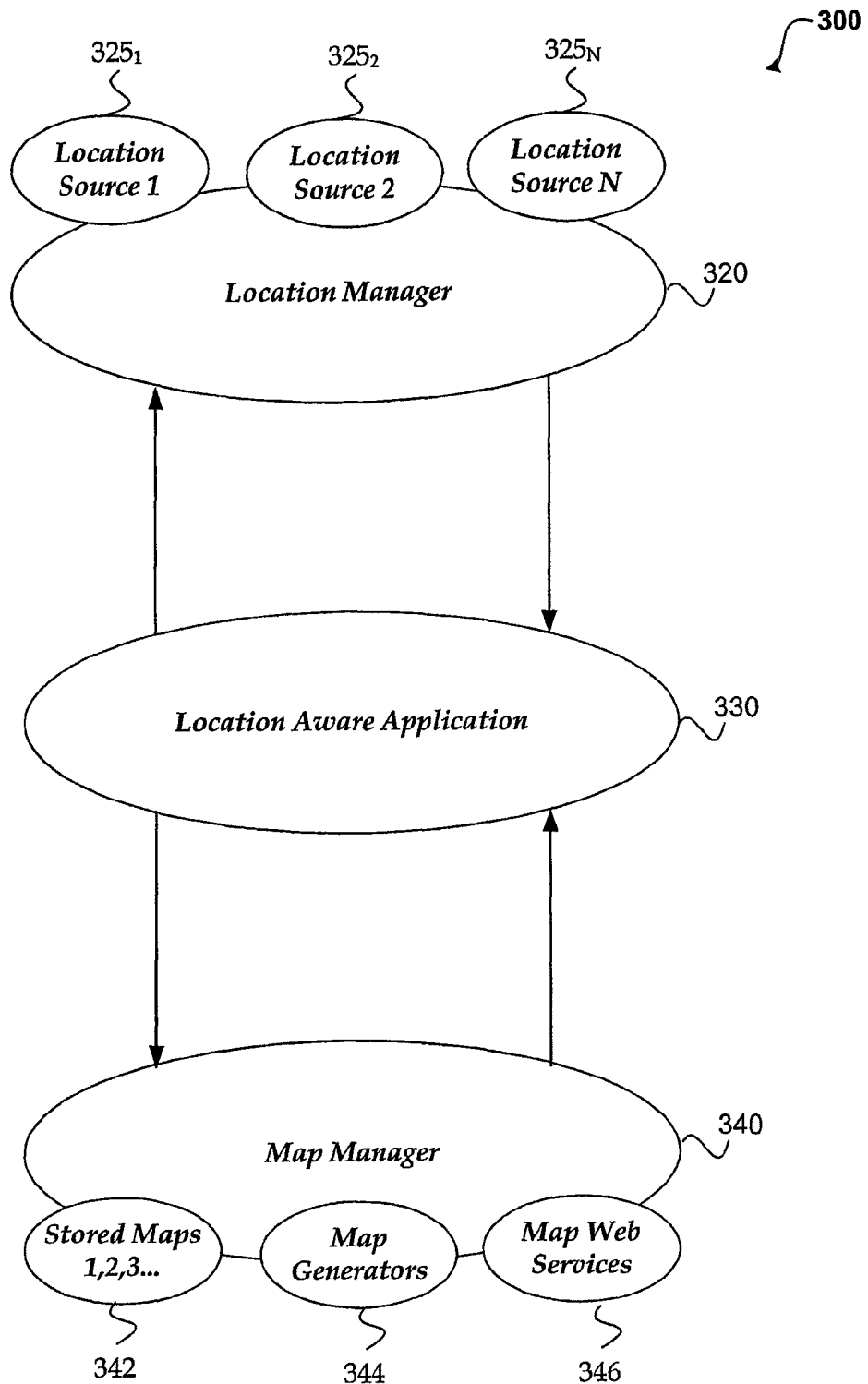
FIG. 3 illustrates a location aware system.

Generally, the present invention is directed at providing a method and system for making it easier to develop and use location aware software applications. Combining the currently separate and complex tasks of location information gathering, analysis, and display and making them integrated such that non-experts can build location services into their applications increases a developer's capability to write rich location-aware software applications Illustrative Location Aware Development System FIG. 3 illustrates a location aware system, in accordance with aspects of the invention. Location system 300 includes location manager 320, location aware application 330, and map manager 340. Location manager is coupled to location sources 325(1-N). Map manager is coupled to map store(s) 342, map generator(s) 344, and map web service(s) 346.

Location manager 320 is configured to receive location information from on or off device location sources (325(1-N)) and abstract the location information into location events that are provided to location aware application 330. The location sources may be anything that provides location information about an item. For example, one location source may be a GPS receiver. Another location source may be a user input that indicates the position of an item. For example, a user may indicate through a user input on a device that they are at a certain location. The user may enter a location into their device using a keypad, touch screen, voice recognition, and the like. Other location sources may be simulated location sources. Instead of a developer having to be in the field to test application 330, they may use simulated location data. Another location source may be an RFID tag. Each location source may provide different resolutions of location data. For example, some location sources may be very accurate while other location sources may only be accurate to within a neighborhood, on a road, and the like.

A location source can correspond to a proximate or distant location source. A proximate source corresponds to location generating hardware, including, but not limited to a GPS receiver or to the mobile device itself which is getting its location from network information. A distant location source corresponds to location information either pushed or pulled from a remote networked source (e.g. such as a pushed SMS message arriving with the location of my friend's car, or location information returned (pulled) via a web-request). Both the proximate and distant location sources are treated as abstract logical entities. This makes the programming model similar for many different kinds of location information.

Once the location data is received, location manager 320 determines if any location event is triggered that relates to application 330. Instead of only being able to provide raw location data from the location sources to application 330, location manager 320 provides location events upon the occurrence of an item having some logical relationship with an area of interest, such as entering or leaving an area of interest.

Figure 5:
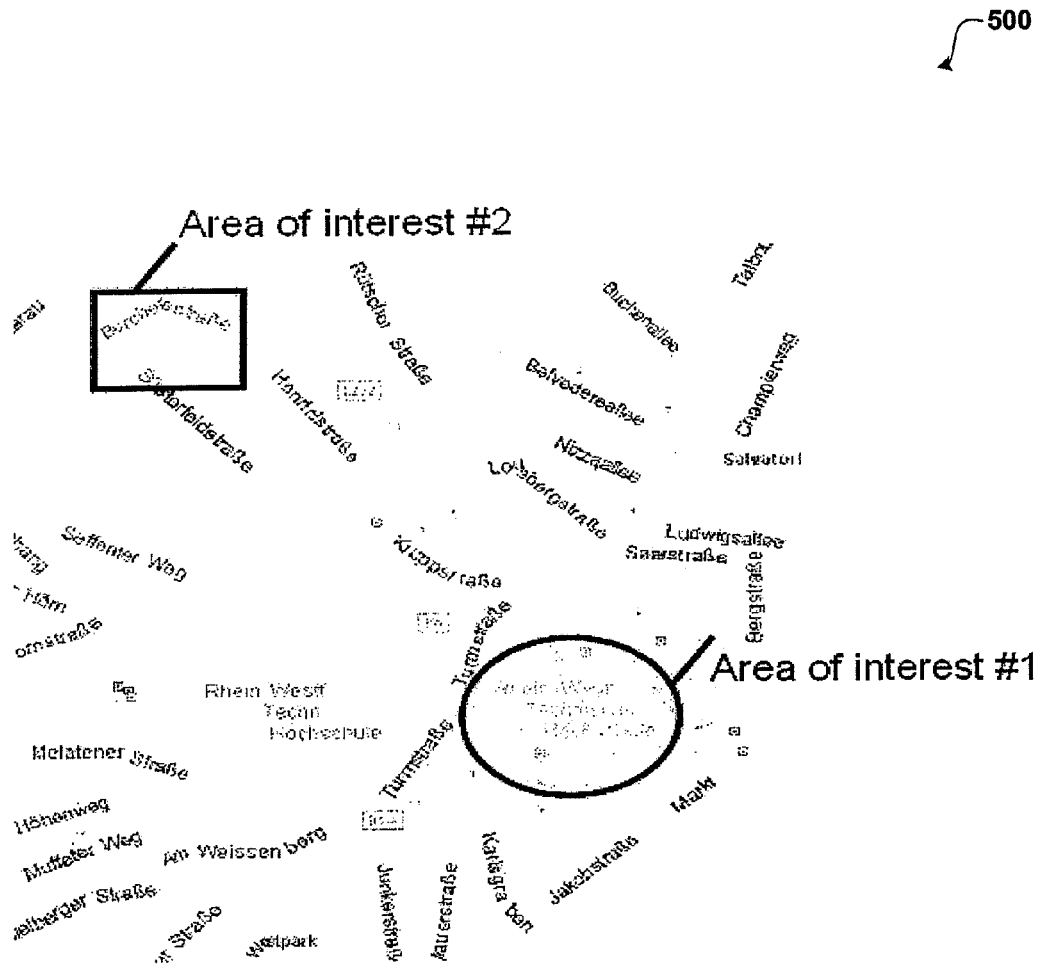
FIG. 5 shows defining exemplary areas of interest.

Generally, an area of interest provides an abstraction of the location data (See FIG. 5 and related discussion). An area if interest can relate to any area and can be indoors or outdoors. For example, an indoor location could be used to show the location of a fixed asset (e.g. conference room) and/or moveable asset (e.g. people, office equipment, inventory).

An outdoor area of interest could be a city block, an area around a building or some other landmark, or some other predefined area. An outdoor area of interest may also be a movable asset (e.g. a car or a person).

Instead of an application having to interpret the raw location data, application 330 registers for location events based on the relation of the item to areas of interest. Upon the occurrence of the predefined location event, location manager 320 notifies application 330. At that point, application 330 executes an event driven code routine that was developed to handle the location event.

Location aware application 340 responds to the generated location events. Upon the occurrence of a location event, location aware application 330 supplies a set of weighted criteria to MapManager 340. For example, the weighted criteria may include a suggested map resolution along with a set of objects that the applications would like displayed on the map they draw. The application may also supply objects that they want rendered on top of the existing map. In addition to the application responding to event driven rendering of maps, the application can also be self driven. For example, an application may have a timer that periodically "pulls" information and renders a new map. So in addition to "push" event-driven responses, the application can also "pull" data and take action.

Map manager 340 abstracts the map information from the application such that it does not need to know details regarding how to handle maps or location information. Instead of the application having to include complex map rendering code, the application provides map manager 340 with the name or type of map it would like displayed. Map generators 344 are not tied to any single application, or rendering engine. For example, one rendering engine may be vector based, whereas another rendering engine may be bitmap based. Location aware application 330 is provided with an interface to interact with map generator 344.

Map Manager 340 provides a rich set of features to location aware application without application 330 having to know the details of how to implement the map code. For example, suppose application 330 wants to allow a user to point to an area on a map and then have that data translated to a latitude and longitude, or in the case of an indoor map into indoor coordinate systems. Map manager 340 provides that information to application 330. MapManager 340 acts as the broker between application 330 and the map-rendering technologies and supplies functionality to the application. Some of the functionality includes mapping X/Y screen coordinates on the device to Lat/Long/Altitude map coordinates on the map. For example, a user may click on the screen that is currently displaying a map to input their location. In response to the user input, map manager maps the X/Y screen location to the Lat/Long/Altitude map location. Similarly, map manager 340 maps Lat/Long/Altitude map data to X/Y screen locations allowing the application to dynamically render on top of the currently displayed map. The altitude on some map renderings, such as a ski-area map, may significantly affect the X/Y location. There are many ways of converting an X/Y coordinate into a Lat/Long/Altitude coordinate. Generally, map manager receives the X/Y screen coordinate, matches the coordinate to the map, and then, based on the scale of the map, its projection technology and map boundaries provides the Lat/Long/Altitude coordinate. The application does not need to understand how the maps themselves are being rendered or what "projection technology" is being used. Many different map projection technologies are possible, including, but not limited to, classical map-projection techniques such as Mercator projections, Cylindrical projections, Polar projections, Grid projections and custom projection technologies (e.g. a ski-area map, a stadium seating map, etc). The application may seamlessly move between different projection techniques.

MapManager 340 also supplies high level events about the set of available maps to application 330. These events provide the application important information such as when there are several maps available that meet the criteria requested by the application. Application 330 is not confined to using a single map for display. For example, one application may use a street map for one period of time and then use a metro map (e.g. showing bus routes, subway tunnels, etc.) during another time. Map manager 340 ranks the maps according to their order of suitability. When there are no maps available that meet the criteria provided by application 330, but map manager 340 may locate maps that meet some of the criteria, then those maps may be provided.

MapManager 340 also allows for the dynamic provisioning of new maps onto the device. The maps may be downloaded to the device at any time. For example, a new map may be downloaded for a public transportation application when a new transit route is added. According to one embodiment, these maps are represented using two files, one binary and opaque to MapManager and one that it understands. According to one embodiment, the map is represented using an XML file. The map manager is able to read the XML file and obtain the information necessary to add the map to the on-device local map data store. Maps may also be added to the map store by the developer or through other sources.

The following is an exemplary XML representation.

```
– <MapData Version="1.01" MapProjection="SimpleGrid"
MetersPerPixel="2.80253449893166" MapInfoClass="none"
CustomMapRenderer="none">
  – <SimpleLatLongRectangle
    MapFileName="device_map_1_0.PNG">
      <MapCoordinate Position="NorthWestCorner"
      Latitude="50.7867" Longitude="6.07814549019608" />
      <MapCoordinate Position="NortEastCorner"
      Latitude="50.7867" Longitude="6.09407106666667" />
      <MapCoordinate Position="SouthWestCorner"
      Latitude="50.7766295454545" Longitude="6.07814726827094" />
      <MapCoordinate Position="SouthEastCorner"
      Latitude="50.7766295454545" Longitude="6.09406985757576" />
    </SimpleLatLongRectangle>
  </MapData>
```

MapProjection refers to the technology that is used to display the map. In this particular example, the map projection type is a simple grid. MetersPerPixel refers to the average resolution of the map. MapInfoClass refers to whether there is a custom class that is needed to answer questions about this map. This field allows a developer to include a custom class within the programming environment that may be called when this map is displayed. Similarly, CustomnMRenderer refers to whether a custom rendering engine is needed to draw the map. The MapFileName field refers to the binary file name that contains information that the map-renderering engine that will be used to draw the map. The SimpleLatLongRectangle field identifies the map as a rectangle defined by latitude and longitude coordinates.

The following example illustrates some of the custom fields being utilized.

```
- <MapData Version="1.01" MapProjection="SimpleGrid"
MetersPerPixel="2.80253449893166" MapInfoClass="CustomMapInfo1"
CustomMapRenderer="CustomMapRender1">
    <CustomMapInfo1 MapFileName="device_map_1_0.PNG"
    classId="CustomMapEngine.MapInfoParser" />
    <CustomMapReder1 MapFileName="device_map_1_0.PNG"
    classId="CustomMapEngine.MapRenderEngine" />
</MapData>
```

MapManager 340 may have multiple maps available on the device in a map store (342) that may be used by application 330. Map manager 340 searches though the set of maps available on the device in map store 342 and looks for the best map to be used. After being selected, the best fit map is selected and rendered.

Figure 4:
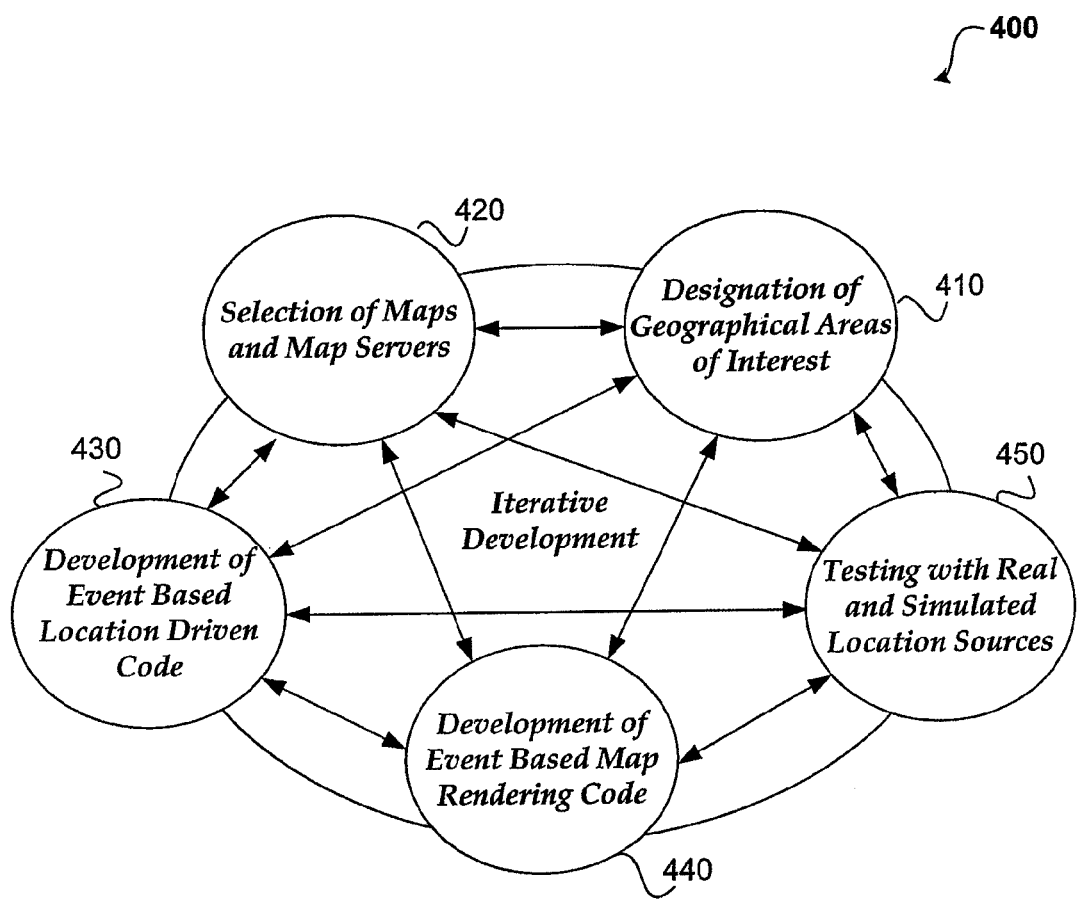
FIG. 4 shows a state diagram of interaction for development of location aware applications.

FIG. 4 shows a state diagram of interaction for development of location aware applications, in accordance with aspects of the invention.

Starting at state 410, geographical areas of interest are defined. The selection of the areas of interest may occur before or after the location aware application is deployed. Additionally, this information may be sent out to the devices at any time. An area of interest is a predefined region that relates to a map. The area of interest may be any size that is definable. For example, an area of interest may be the size a square meter or an entire country. The areas of interest are defined based on the needs of the location aware application. For example, suppose the location aware application being developed determines when a child leaves their school and returns home. In this particular example, areas of interest may be an area including the school and another area of interest including the child's home. Some areas of interest may be selected by the developer, while other areas of interest may be selected by a user. For example, many applications, such as the example described above, are configured after the application is provided to the user. In the above example, a parent may select the areas of interest.

State 420 shows the selection of maps and map servers. A developer may select between the maps available in the system or may create their own maps. According to one embodiment of the invention, the available maps are shared across location applications such that different location aware applications may use the same map. In this way, each location aware application does not need to develop their own maps. In most instances, the specifics of the map rendering is hidden from the developer of the location aware application. Should the developer desire to include their own rendering software they may incorporate their rendering software into the environment at state 440.

At state 440, the developer may also set up their preference for the rendering. For example, the developer may want to use a vector based rendering engine for one part of the application and a bitmap based system for another part of the application. The map engines may be provided by many different sources. Any developer who wants to build an engine may supply a map engine that conforms to the programming interface. Each map engine is plugged into the development system.

At state 430, the developer programs the event based location code that is executed in response to events associated with the areas of interest within their application. This event based code is dependent upon the type of location aware application being developed and may include many different types of data. For example, a program may perform an action when a user reaches a predetermined location. In the tracking the child example above, an example routine may be programmed to highlight the home or school based on the location of the child at that particular time. The developer may also place items onto the map in response to the events.

At state 450, the location aware application may be tested using real and/or simulated location sources. The system provides a simulator of a location source such that an application may be tested before it is put to us in the field. Using a simulated data source allows a developers event based location code to be tested upon the occurrence of a location event. Another use of a simulated location-source data is to "play back" previously recorded real-world location data. This is useful for application development, testing and debugging.

FIG. 5 shows defining exemplary areas of interest, in accordance with aspects of the invention. As illustrated in FIG. 5, two areas of interest have been defined. Area of interest #1 is defined by an oval boundary area and area of interest #2 is defined by a rectangular border. Although the areas of interest have been defined using predetermined geometric shapes, the areas of interest may be more defined in any way that defines the area. For example, the area of interest could be defined as a neighborhood, a county, an area between certain roads, and the like. According to one embodiment of the invention, the developer uses a set of predefined shapes to designate the areas of interest. The user may also select a point on the map and then provide a radius to extend from that point to be the area of interest. The area of interest may also be set using latitude and longitude coordinates.

While the map illustrated in FIG. 5 shows a city map including streets, the map may be any type of map. For example, the map could be a ski map, a map of a forest, a park, a golf course, building floor plans, stadium seating maps and the like. As discussed above, when and area of interest is designated an event may be triggered based on something entering or leaving the area.

While not illustrated, an area of interest may be a certain type of location. For example, a location aware application may be interested in knowing when it is close to a coffee shop or a movie theater. In this particular example, each coffee shop or movie theater known by the system could be an area of interest. As more coffee shops become available, their location could be dynamically added to the application such that the application is aware of them. Other location aware applications may define an area of interest as a particular store, sporting arena, bus stop, office building, and the like.

Figure 6:
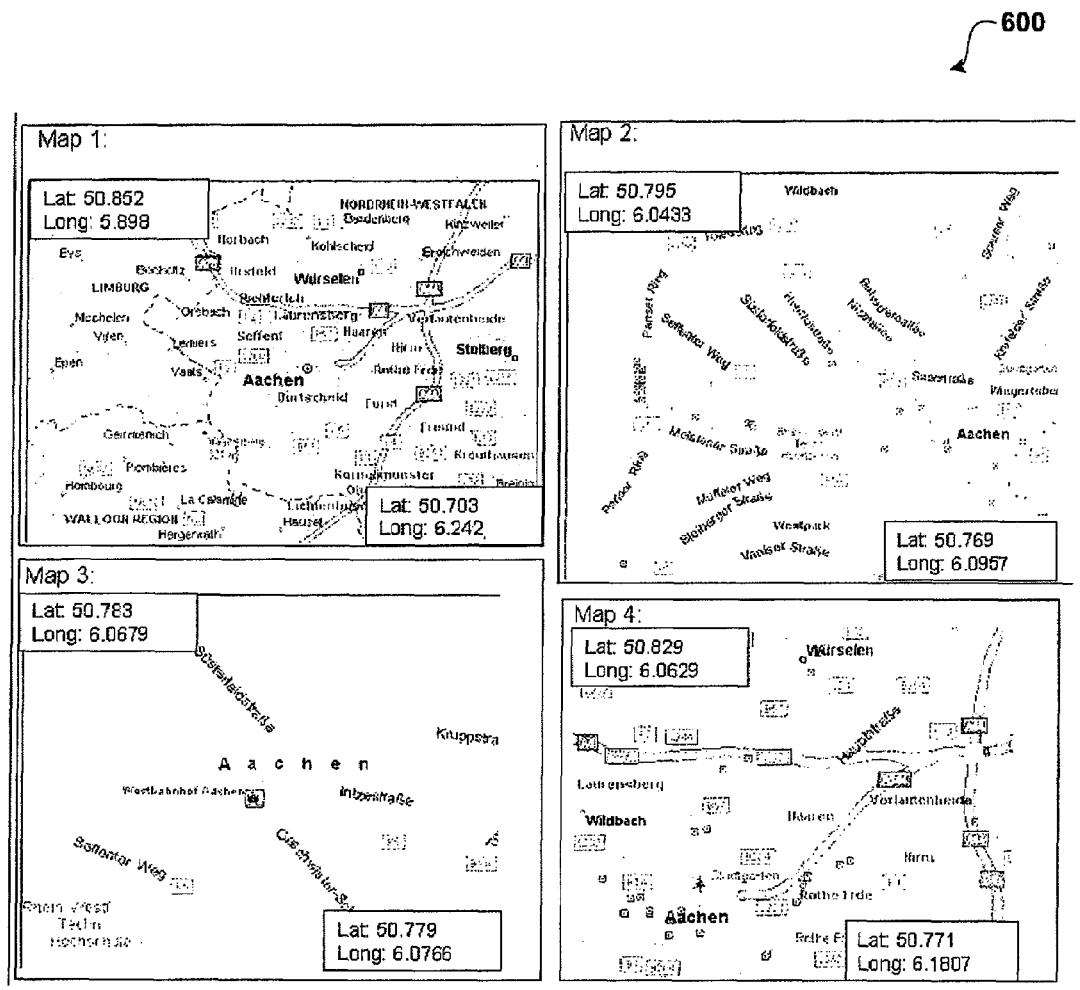
FIG. 6 illustrates exemplary maps that may be used by a location aware application.

FIG. 6 illustrates exemplary maps that may be used by a location aware application, in accordance with aspects of the invention. As illustrated, these maps are defined as a simple rectangle defined by latitude and longitude. Each of the four maps includes an upper left latitude and longitude and a lower right latitude and longitude. As discussed above with regard to FIG. 3, the maps may be defined in many different ways. Any location aware application could use these maps for display when appropriate.

Figure 7:
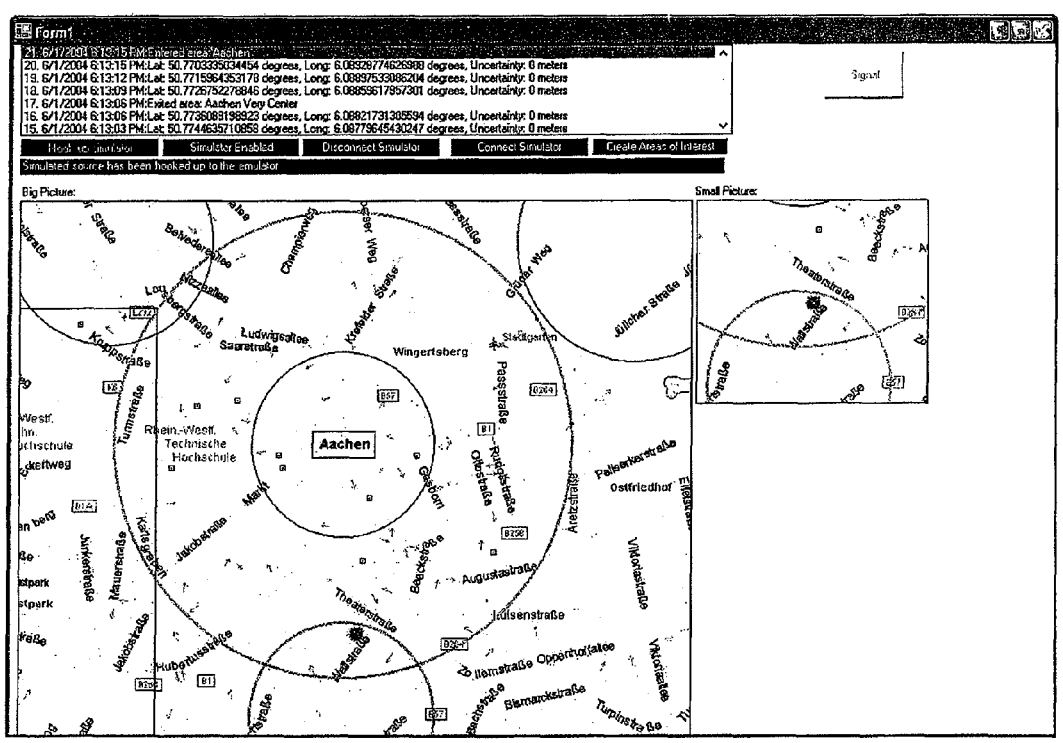
FIG. 7 illustrates an exemplary simulation screenshot for a location aware application.

FIG. 7 illustrates an exemplary simulation screenshot for a location aware application, in accordance with aspects of the invention. Within the simulator, two map views are displayed including a smaller more detailed view and a global, overall view. Illustrated on the maps are predefined areas of interest which are represented by circular regions and square regions. When the simulated movement enters or leaves an area, the developer may determine if the appropriate code they developed is working properly.

Illustrative Operating Environment

Figure 1:
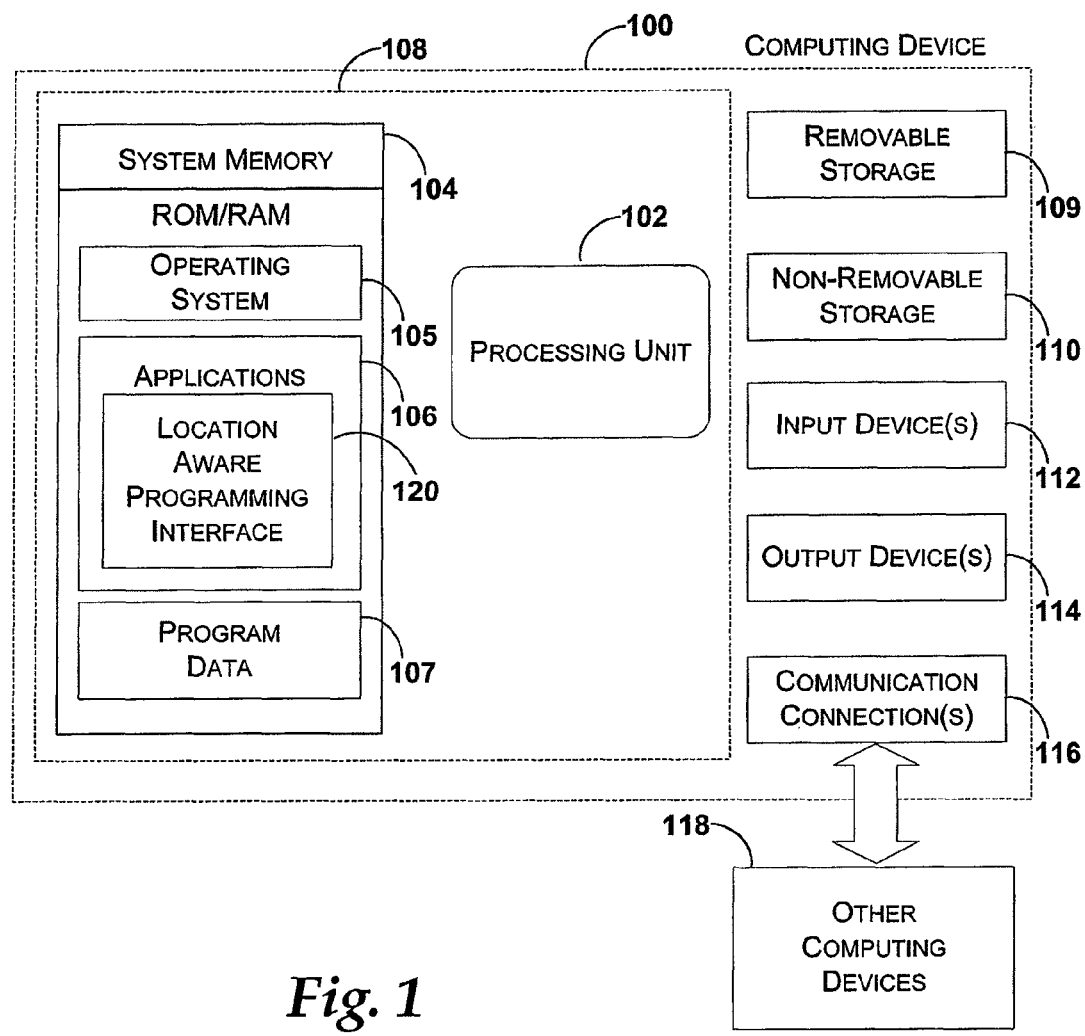
FIGS. 1 and 2 illustrate an exemplary computing devices that may be used in exemplary embodiments of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include location aware programming interface 120 that is used in building location aware applications for mobile devices. This location aware programming interface can be integrated with map selection, management and rendering interfaces. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
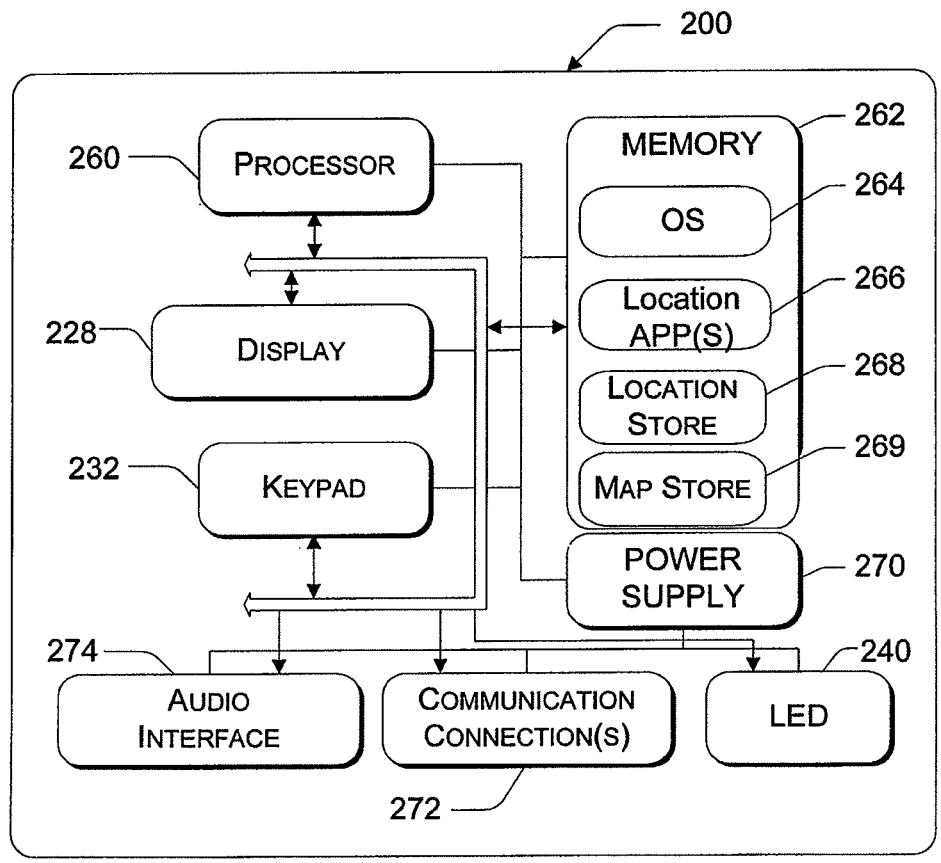

FIG. 2 illustrates a mobile computing device that may be used in one exemplary embodiment of the present invention. With reference to FIG. 2, one exemplary system for implementing the invention includes a mobile computing device, such as mobile computing device 200. Mobile computing device 200 includes processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, such as the Windows CE operating system from Microsoft Corporation, or another operating system, which is resident in memory 262 and executes on processor 260. Keypad 232 may be a push button numeric dialing pad (such as on a typical telephone), a multi-key keyboard (such as a conventional keyboard). Display 228 may be a liquid crystal display, or any other type of display commonly used in mobile computing devices. Display 228 may be touch-sensitive, and would then also act as an input device.

One or more application programs, such as location app(s) 266 are loaded into memory 262 and run on the operating system 264. One or more location aware applications (266) reside on mobile computing device 200 and are programmed to perform instructions relating to location based applications. The location aware application may reside in the hardware or software of the device. Mobile computing device 200 may also include volatile and non-volatile storage within memory 262. Memory 262 also includes location data store 268 that is used to store location based information and map store 269 that is used to map based information. Location store 268 is a global facility for storing location that may be used by all location aware applications (266) on the device. Map store 269 is also a global facility for storing map information that may be used by all location aware applications (266) on the device. According to one embodiment, the repository (268) is on-device cache of location and map information. There may be more than one location store on mobile device 200. For example, there may be a private and public location data store.

Mobile computing device 200 includes power supply 270, which may be implemented as one or more batteries. Power supply 270 might further include an external power source, such as an AC adapter or a powered docking cradle that supplements or recharges the batteries.

Mobile computing device 200 is shown with two types of optional external notification mechanisms: LED 240 and audio interface 274. These devices may be directly coupled to power supply 270 so that when activated, they remain on for a duration dictated by the notification mechanism even though processor 260 and other components might shut down to conserve battery power. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes communications connection(s), such as a wireless interface layer, that performs the function of transmitting and receiving communications. Communications connection 272 facilitates wireless connectivity between the mobile computing device 200 and the outside world. According to one embodiment, transmissions to and from communications connection 272 are conducted under control of the operating system 264.

Figure 8:
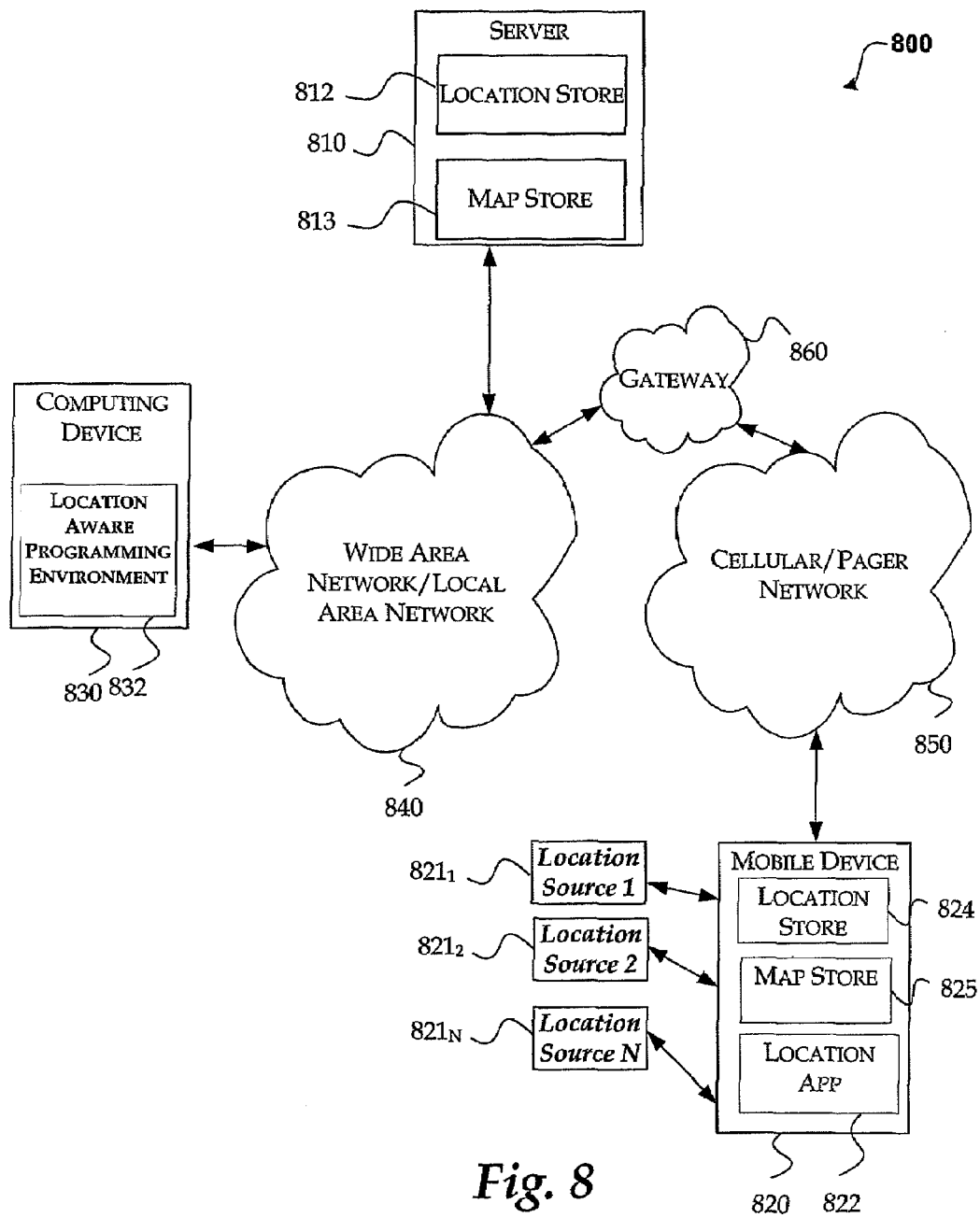
FIG. 8 is a functional block diagram generally illustrating an location aware development system in accordance with aspects of the invention.

FIG. 8 is a functional block diagram generally illustrating an location aware development system 800, in accordance with aspects of the invention. Server 810 and computing device 830 are computing devices such as the one described above in conjunction with FIG. 1 and mobile device 820 is a mobile computing device such as the one described above in conjunction with FIG. 2.

Typically a user develops a location aware applications using a computing device, such as computing device 830. The location aware application, however, may be developed using a mobile device, such as mobile device 820. Location aware programming environment 832 is configured to provide a developer with a set of programming interfaces to develop a location aware application. Application 832 is configured to communicate with server 810. According to one embodiment, server 810 is configured to provide computing device 830 with location information from location store 812 and map information from map store 813. Server 810 or a mobile device may also be configured to simulate a location source while developing a location aware application. For example, the simulated location source can run on the mobile device and simulate the input of a GPS source and the like. The computing devices may communicate using any one of several client-server protocols.

Mobile device 820 includes location aware application 822 that has been developed using the location aware programming environment (832). More than one location aware application may be included on device 820. Attached to mobile device 822 are N location sources (821(1-N)). These location sources, both on and off-device, as described above, provide location data to location application 822. Location store 824 includes location information that may be accessed by all of the location aware applications on device 820. Map store 825 includes map information that may be accessed by all of the location aware applications on device 820. For example, location store 824 and map store 825 may include maps, rendering engines, and any other information that may be shared across the applications.

Cellular/pager network 850 is a network responsible for delivering messages to and receiving messages from wireless devices. The cellular/pager network 850 may include both wireless and wired components. For example, cellular/pager network may include a cellular tower that is linked to a wired telephone network. Typically, the cellular tower carries communication to and from cell phones, long-distance communication links, and the like. The wireless devices can also connect directly to WAN's, LANs, etc, using hardware such as Wi-Fi cards that are becoming increasingly available for mobile devices.

Gateway 860 routes messages between cellular/pager network 850 and WAN/LAN 840. For example, a computer user may send a message that is addressed to a cellular phone. Gateway 860 provides a means for transporting the message from the WAN/LAN 840 to cellular/pager network 850. Conversely, a user with a device connected to a cellular network may be browsing the Web. Gateway 860 allows hyperlink text protocol (HTTP) messages to be transferred between WAN/LAN 840 and cellular/pager network 850.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method for location aware applications, comprising:
   defining areas of interest on a map having a size that is selectable by a user;
   receiving raw location data at a location manager;
   determining when an item enters, exits and moves inside one of the areas of interest;
   generating a location event when it is determined that the item entered, exited, or moved inside one of the areas of interest;
   providing notice of the location event from the location manager to a location aware application without the raw location data;
   executing event driven code supplied by the location aware application in response to the notice of the location event received from the location manager;
   receiving at a map manager from the location aware application criteria including a type of an object to display;
   providing different map choices comprising separate maps to the location aware application based on the criteria;
   providing a ranking of the different map choices according to their order of suitability based on each of the different map choices comparison to the received criteria for the location aware application to make a selection from;
   selecting a map from a map store using the ranking of the different map choices;
   sharing the selected map with another location aware application without the map manager and the other location aware application requiring raw location data; and
   displaying the map using a map rendering engine, wherein the map rendering engine is selected from at least two map rendering engines.

2. The method of claim 1, wherein the area of interest is a predefined area on a map having a boundary defined by a user.

3. The method of claim 2, wherein determining when the item enters and exits an area of interest comprises obtaining location information from at least one location source and determining whether the item is within the area of interest.

4. The method of claim 2, wherein generating the location event comprises generating a location event in response to at least one of the following events: a determination that the location of the item has entered the area of interest, a determination that the location of the item has exited the area of interest and a determination that the location of the item as moved a specified distance inside an area of interest.

5. The method of claim 2, further comprising supplying at least one object to the map rendering engine to overlay on the map.

6. The method of claim 2, further comprising dynamically provisioning the map store.

7. The method of claim 2, wherein the map includes a description of the map using an XML representation.

8. The method of claim 7, wherein the description comprises a map projection; a resolution; an indication of the map rendering engine used to display the map and an area the map includes.

9. A computer-readable storage medium having computer-executable instructions for location aware applications, the instructions comprising:
   defining areas of interest on a map having a size that is selectable by a user;
   receiving raw location data at a location manager;
   determining when an item enters, exits and moves inside one of the areas of interest;
   generating a location event in response to the determination;
   providing notice of the location event from the location manager to a location aware application without the raw location data;
   executing event driven code supplied by the location aware application in response to the notice of the location event received from the location manager;
   providing different map choices to the location aware application that are ranked according to their order of suitability for the location aware application based on received criteria received at a map manager from the location aware application including a type of an object to display to select from;
   selecting a map from a map store, wherein the map may be shared by other location aware applications; and displaying the map using a map rendering engine, wherein the map rendering engine is selected from at least two map rendering engines.

10. The computer-readable storage medium of claim 9, further comprising determining areas of interest, wherein the area of interest is a predefined area on a map.

11. The computer-readable storage medium of claim 9, wherein determining when the item enters and exits an area of interest comprises obtaining location information from at least one location source and determining whether the item is within the area of interest.

12. The computer-readable storage medium of claim 9, wherein generating the location event comprises generating a location event in response to at least one of the following events: a determination that the location of the item has entered the area of interest, a determination that the location of the item has exited the area of interest and a determination that the location of the item has moved a specified distance inside an area of interest.

13. The computer-readable storage medium of claim 9, further comprising supplying at least one object to the map rendering engine to overlay on the map.

14. The computer-readable storage medium of claim 9, further comprising dynamically provisioning the map store.

15. The method of claim 9, wherein the map includes a description of the map using an XML representation.

16. The computer-readable storage medium of claim 15, wherein the description comprises a map projection; a resolution; an indication of the map rendering engine used to display the map and an area the map includes.

17. The computer-readable medium of claim 9, wherein displaying the map using the map rendering engine comprises selecting a projection technique depending on the type of map being rendered, wherein the projection technique is selected from at least two projection techniques of: Mercator, Polar, Grid, and Custom.

18. A system, comprising:
a map store configured to store maps;
map rendering engines that are configured to render maps;
a processor and a computer-readable storage medium, wherein the processor is configured to perform actions, comprising:
defining areas of interest on a map having a size that is selected by a user;
receiving raw location data at a location manager;
generating a location event in response to determining when an item enters, exits and moves inside one of the areas of interest;
providing notice of the location event from the location manager to a location aware application without the raw location data;
executing event driven code supplied by the location aware application in response to the notice of the location event received from the location manager;
providing different map choices to a location aware application that are ranked according to their order of suitability based on received criteria, at a map manger from the location aware application, including a type of an object to display for the location aware application to select from;
selecting a map from the map store, wherein the map may be shared by other location aware applications without the other location aware applications requiring raw location data; and
displaying the map using one of the map rendering engines.

19. The system of claim 18, wherein determining when the item enters and exits an area of interest comprises obtaining location information from at least one location source and determining whether the item is within the area of interest.

20. The system of claim 19, wherein each map includes a description of the map using an XML representation, wherein the description comprises a map projection; a resolution; an indication of the map rendering engine used to display the map and an area the map includes.

* * * * *